United States Patent
Kaufman et al.

(10) Patent No.: US 6,855,914 B1
(45) Date of Patent: Feb. 15, 2005

(54) METHOD AND APPARATUS TO AUTOMATICALLY DETERMINE TYPE OF GUN CONNECTED TO A WIRE FEEDER

(75) Inventors: Charles L. Kaufman, Neenah, WI (US); Albert M. Nowak, Appleton, WI (US); Jeffery R. Ihde, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/605,450

(22) Filed: Sep. 30, 2003

(51) Int. Cl.[7] .................................................. B23K 9/10
(52) U.S. Cl. ................................ 219/137.71; 219/130.5
(58) Field of Search .......................... 219/137.71, 132, 219/130.5, 130.21; 901/42

(56) References Cited

U.S. PATENT DOCUMENTS

| | | | | |
|---|---|---|---|---|
| 4,404,457 A | * | 9/1983 | Rokujio et al. | 219/137.2 |
| 5,357,076 A | * | 10/1994 | Blankenship | 219/121.54 |
| 5,512,726 A | * | 4/1996 | Arantes et al. | 901/42 |
| 6,563,085 B2 | * | 5/2003 | Lanouette et al. | 219/130.5 |
| 6,563,087 B1 | * | 5/2003 | Yokoyama et al. | 219/240 |
| 6,627,849 B2 | * | 9/2003 | Ihde et al. | 219/130.5 |

* cited by examiner

*Primary Examiner*—Clifford C. Shaw
(74) *Attorney, Agent, or Firm*—Ziolkowski Patent Solutions Group, LLC

(57) ABSTRACT

A process is disclosed that monitors a characteristic of a welding gun connected to a wire feeder and, based on the detected characteristic, automatically determines the type of gun connected and sets operating parameters of the wire feeder and/or welding gun accordingly.

26 Claims, 4 Drawing Sheets

METHOD AND APPARATUS TO AUTOMATICALLY DETERMINE TYPE OF GUN CONNECTED TO A WIRE FEEDER

BACKGROUND OF INVENTION

The present invention relates generally to welding systems and, more particularly, to a method and apparatus of automatically determining the type of gun or torch connected to a wire feeder or other component of a welding-type system. Moreover, the present invention relates to automatic setting of operating parameters of a welding-type system based on the type of component connected.

MIG welding, formerly known as Gas Metal Arc Welding (GMAW), combines the techniques and advantages of TIG welding's inert gas shielding with a continuous, consumable wire electrode. An electrical arc is created between the continuous, consumable wire electrode and a workpiece. As such, the consumable wire functions as the electrode in the weld circuit as well as the source of filler metal. MIG welding is a relatively simple process that allows an operator to concentrate on arc control. MIG welding may be used to weld most commercial metals and alloys including steel, aluminum, and stainless steel. Moreover, the travel speed and the deposition rates in MIG welding may be much higher than those typically associated with either Gas Tungsten Arc Welding (TIG) or Shielded Metal Arc Welding (stick) thereby making MIG welding a more efficient welding process. Additionally, by continuously feeding the consumable wire to the weld, electrode changing is minimized and as such, weld effects caused by interruptions in the welding process are reduced. The MIG welding process also produces very little or no slag, the arc and weld pool are clearly visible during welding, and post-weld clean-up is typically minimized. Another advantage of MIG welding is that it can be done in most positions which can be an asset for manufacturing and repair work where vertical or overhead welding may be required.

A wire feeder is typically used to deliver welding wire to a weld. Generally, the wire feeder includes a spool of welding wire that is translated by a drive assembly from the wire feeder to a welding gun whereupon the welding wire is introduced to the weld. Operation of the wire feeder is typically governed by a combination of control signals from the power source, user inputs, and feedback received from the weld. For example, wire feeders have been designed to automatically adjust the rate by which welding wire is delivered to the weld so as to maintain either a constant voltage or constant current level at the weld. For example, the higher the rate or wire feed speed, the higher the amperage.

Most wire feeders include an output terminal designed to receive a connecting cable from the welding gun. Typically, the output terminal is a receptacle designed to receive a pinned connector attached to the welding gun. In operation, uni- or bi-directional control signals are passed from the gun and wire feeder across the connecting pins and associated control cable. Some wire feeders are designed to work with a dedicated gun type while other wire feeders may be connected to multiple types of welding guns. For those wire feeders that are applicable with more than one type of welding gun, it is incumbent upon the user interactively to adjust or set the operating parameters on the wire feeder setup menu appropriately. If the operating parameters and the welding gun connected to the wire feeder are mismatched, the welding process may be negatively affected and/or cause damage to either the wire feeder or welding gun, or both.

It would therefore be desirable to have a method and apparatus to automatically determine the type of gun connected to the wire feeder. It would also be desirable to have a system whereby operating parameters of the welding system are automatically set or selected based on the type of welding gun connected to the wire feeder.

BRIEF DESCRIPTION OF INVENTION

The present invention is directed to a system designed to automatically determine the type of gun or other component connected to a wire feeder or other welding-type apparatus that overcomes the aforementioned drawbacks. A control process is disclosed that monitors a physical characteristic of a welding gun connected to a wire feeder and, based on the detected physical characteristic, automatically sets operating parameters of the wire feeder and/or welding gun. For example, when the welding gun is connected to the wire feeder assembly, the type of pin configuration is first determined. From the number of pins, a further determination is made, based on an impedance of a motor, electrical circuit, or digital signature in the welding gun, to determine the type of gun connected. Based on that which is detected, operating parameters of the wire feeder as well as the welding gun are set.

Therefore, in accordance with one aspect of the present invention, a wire feeder is disclosed and includes an output connectable to a gun assembly. The wire feeder further includes a controller configured to automatically determine gun assembly type when the gun assembly is connected to the output.

In accordance with another aspect of the present invention, a controller for a welding-type system is configured to detect an impedance of a motor assembly designed to deliver welding wire to a weld. The controller is further configured to determine, from the impedance, a type of load placed on the motor assembly and, based on the type of load, automatically set an output mode of the motor assembly.

According to yet another aspect of the present invention, a method of controlling operation of a wire feeder includes the step of determining configuration of pins in a connector connecting a welding gun to a wire feeder. From the configuration of pins, an output mode of a motor assembly in the wire feeder is automatically set.

In accordance with yet a further aspect of the present invention, a wire feeder includes means for determining a type of welding gun connected to deliver welding wire to a weld and means for automatically setting an output mode of a motor drive assembly based on the type of welding gun.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

The present invention will be described with respect to a gun detection and parameter setting process that automatically determines the type of welding gun connected to a wire feeder of a welding system. One skilled in the art, however, will appreciate that the present invention may equivalently be used for the detection of other welding components connected to a wire feeder or other apparatus of a welding system. Further, the present invention is also applicable for other high power output systems such as plasma cutting systems and induction heating systems.

Figure 1:
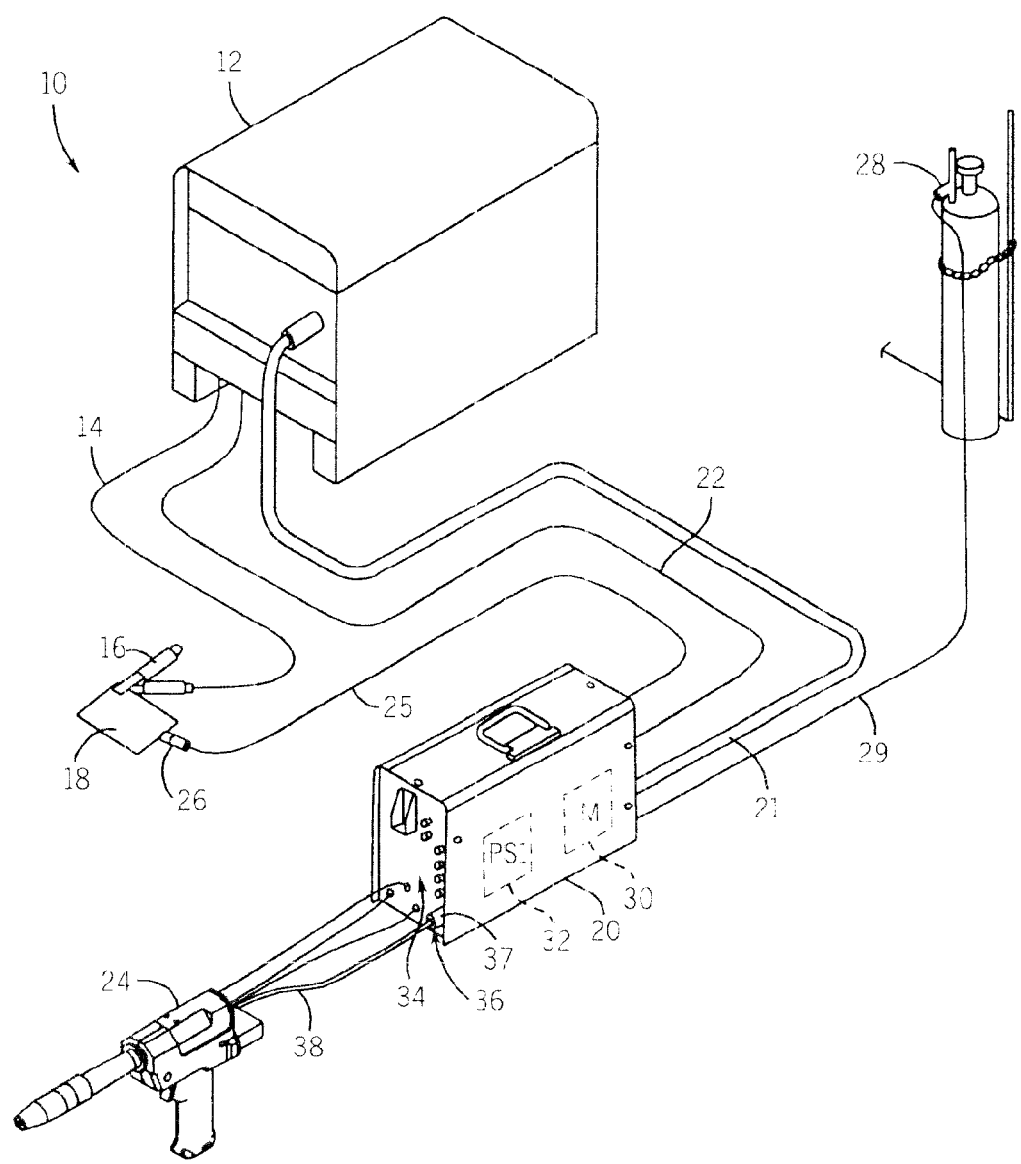
FIG. 1 is a pictorial view of a welding system in accordance with one aspect of the present invention.

Referring to FIG. 1, a welding-type system 10 is show incorporating the present invention. System 10 includes a portable power source 12, which can be an AC or a DC welding power supply operable in either a constant current (CC) or constant voltage (CV) mode. The power source 12 has a work cable 14 and clamp 16 designed to hold a workpiece 18 for welding. Power source 12 is also;
 connected to a wire feeder 20 via an input power cord or
 cable 21. Cable 21 is designed to translate power from
 the power source 12 or other power supply to the wire
 feeder. Also connected between the power source 12
 and the wire feeder 20 is a weld cable 22. The wire
 feeder 20 also includes a welding torch or gun 24 and
 a voltage sensing lead 25 with clip 26 configured to
 provide voltage at the weld feedback to the wire feeder
 and/or power source. A shielding gas cylinder 28 is also
 connected to the wire feeder 20 to provide shielding gas
 through hose 29 for the welding process. Alternately,
 the wire feeder 20 may be disposed in the power source
 12 to provide an integrated MIG welder.

The wire feeder 20 includes a wire drive assembly 30 that includes a spool of welding wire (not shown) that is supplied to the weld under control of a controller 32 that is connected to the power source 12 through cord 22. The controller is governed by a microprocessor capable of being programmed to operate according to certain algorithms and/or programs. User selections or inputs received by the controller from a display and control panel 34 and an internally programmed algorithm cause welding system 10 to operate according to the user selections. For example, the wire feeder includes an output terminal or receptacle 36 that is designed to receive a pin connector 37 designed to engage the output terminal. The pin connector 37 is connected to gun 24 via cable 38.

When the welding torch 24 is positioned proximate to workpiece 18, welding wire is fed into contact with the workpiece 18. Once triggered, an electrical current and voltage are generated to cause the welding wire to be heated and melt. As a result, an electrical arc is established which causes the welding wire to continue to melt as well as transfer the melted welding wire to the workpiece 18 where the welding wire fuses and cools with the workpiece 18. Because the electrical energy supplied to the welding system is typically greater than that required to melt the welding wire, most of the remaining energy is in the form of heat which is transferred to the surface of the workpiece 18 resulting in the workpiece 18 also melting and improved bonding between the melted welding wire and the workpiece 18. As the welding torch 24 is translated across the workpiece 18, melted welding wire is continuously transferred to the workpiece 18.

The power source is designed to operate in either a CC or CV mode. The wire feeder is also designed to introduce flux cored, solid steel, or stainless steel welding wire to a weld. One skilled in the art would appreciate that the present invention is equivalently applicable with other welding systems having different operating specifications and other consumable types.

Figure 2:
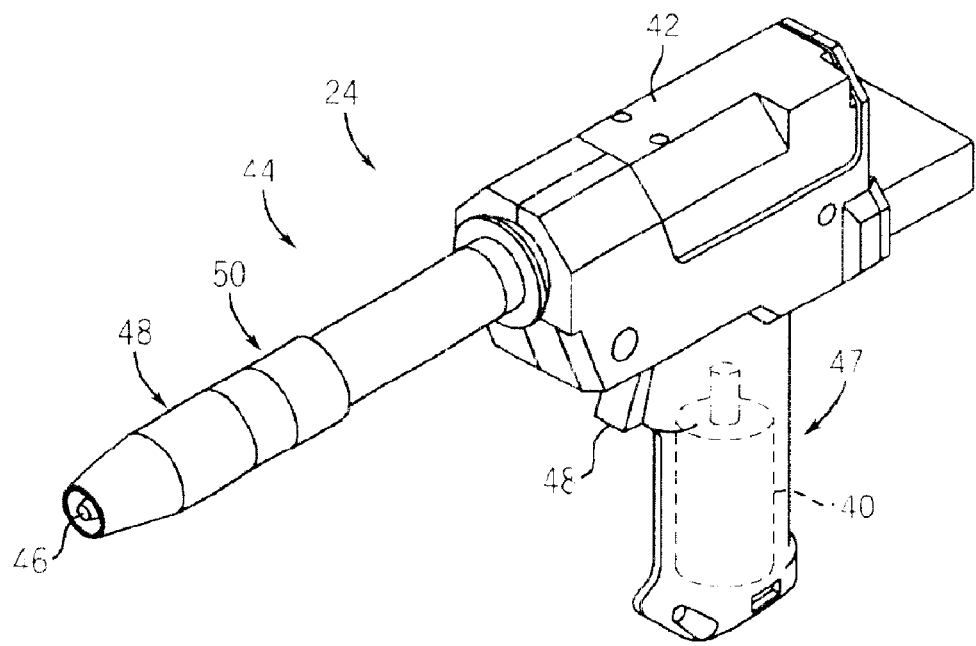
FIG. 2 is a perspective view of a push-pull-type MIG welding gun for use with the welding system illustrated in FIG. 1.

Referring now to FIG. 2, welding gun 24 is perspectively illustrated. Welding gun 24 is an exemplary push-pull type of welding gun that includes an internal motor and drive assembly 40 designed to pull welding wire from the wire feeder or other welding wire source. As will be described in greater detail below, the illustrated push-pull welding gun is an example of only one type of welding gun or torch that may be applicable with the present invention. That is, other types of welding guns are contemplated for use with the welding system illustrated in FIG. 1 in accordance with the present invention.

As indicated previously, welding gun 24 is a push-pull type of welding component that utilizes an internal motor and drive assembly 40 to pull wire from a wire feeder or; other source of welding wire. The welding gun may be air cooled or liquid cooled. As will be further described, welding gun 24 is typically connected to the wire feeder with a 10-pin connector. Welding gun 24 is defined by a gun body 42 that is connected, or integrally formed, with barrel 44. At one end of barrel 44 is a contact tip 46 that, as described above, is used to initiate a welding arc. Tip 46 is centrally disposed within nozzle 48 which is connected to a nozzle adaptor 50. The nozzle and nozzle adaptor may be rotated so as to adjust the position of the tip relative to the nozzle. That is, the tip may be repositioned to extend beyond the end of the nozzle or, alternatively, be repositioned to extend entirely within the nozzle. Welding gun 24 also includes a handle 47 having a trigger mechanism 48 operationally mounted thereto. As discussed above, when the trigger is depressed, an electrical current and voltage are generated to cause the welding wire to be heated and melt. As a result, an electrical arc is established which causes the welding wire to continue to melt as well as transfer the melted welding wire to the workpiece.

Figure 3:
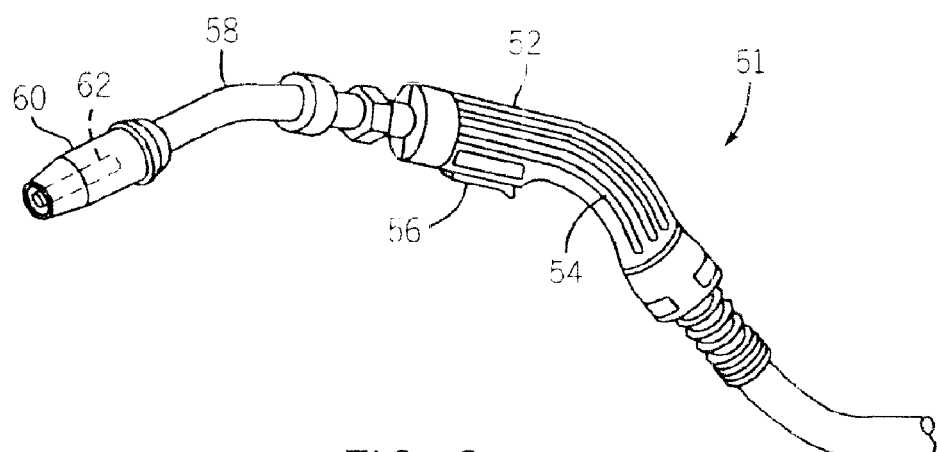
FIG. 3 is a perspective view of a standard MIG welding gun for use with the welding system illustrated in FIG. 1.

Referring now to FIG. 3, another type of welding gun 51 that may be connected to the wire feeder illustrated in FIG. 1 is shown. Welding gun 51 is a conventional MIG welding gun that is used to initiate and maintain welding of a consumable to a workpiece. Welding gun 51 is also defined by a gun body 52 having a handle 54 and trigger mechanism 56. In contrast to the push-pull gun 24 illustrated in FIG. 2, welding gun 51 typically includes a 4-pin connector. Similar to welding gun 24, welding gun 51 includes a barrel 58 that is connected to a welding nozzle 60 having a tip disposed therein 62. Unlike the push-pull type of welding gun illustrated in FIG. 2, welding gun 50 does not include a separate motor and drive assembly to pull welding wire from the wire source. In this regard, welding gun 51 is designed to simply receive the welding wire being pushed by the drive and motor assembly within the wire feeder and deliver that welding wire to the weld.

Figure 4:
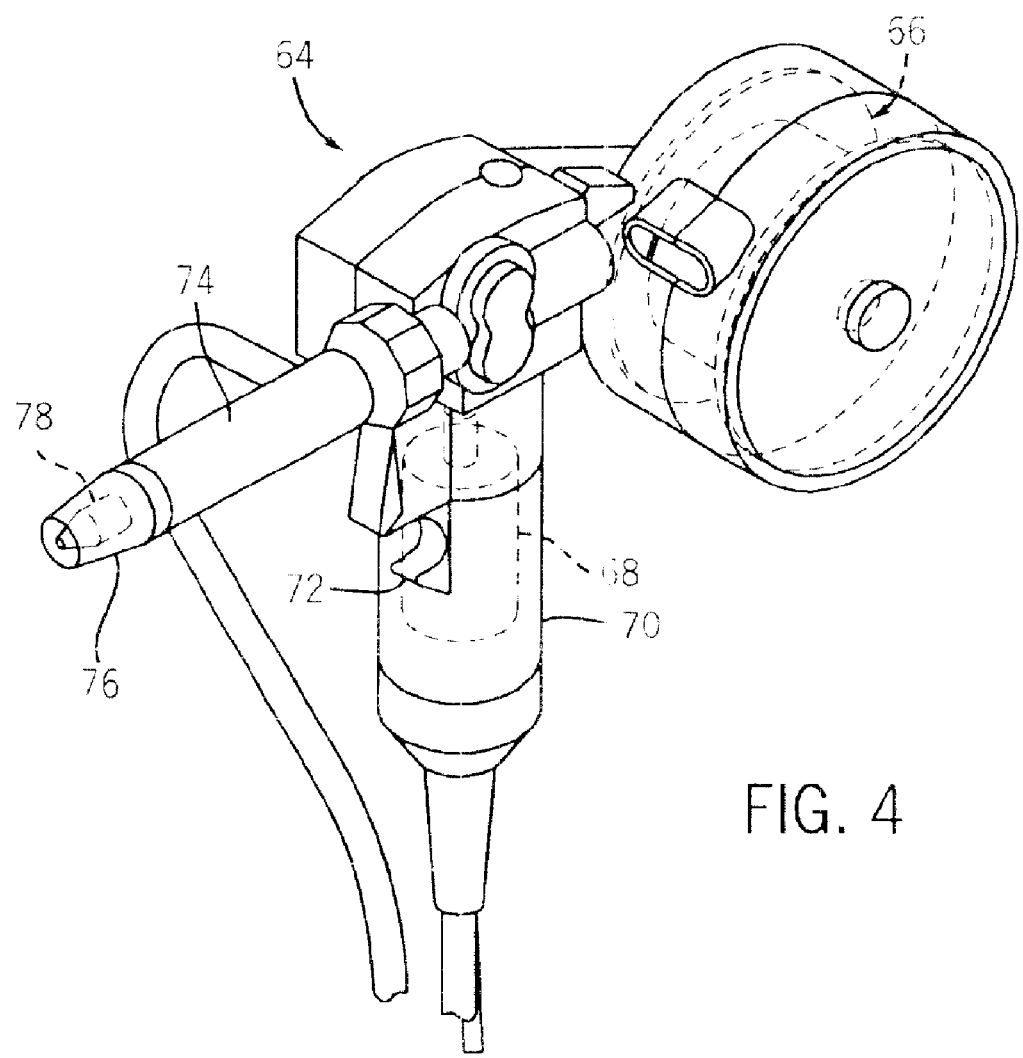
FIG. 4 is a perspective view of a spool-type MIG welding gun for use with the welding system illustrated in FIG. 1.

Referring now to FIG. 4, another type of welding gun is shown. Welding gun 64 is typically considered a spool-type gun that includes an independent source of welding wire housed within an internal spool 66. Wire is introduced to the weld from the internal spool 66 by a motor and drive assembly 68 disposed within the gun handle 70. Disposed on handle 70 is a triggering mechanism 72 that, similar to the previously described welding guns, commences the welding process when depressed by a user. Similar to the welding guns of FIGS. 2 and 3, welding gun 64 includes a barrel 74 that is connected to a nozzle 76 having a contact tip 78 disposed therein. Additionally, similar to the push-pull welding gun of FIG. 2, welding gun 64 typically includes a 10-pin connector for connection to an output terminal of a wire feeder.

Figure 5:
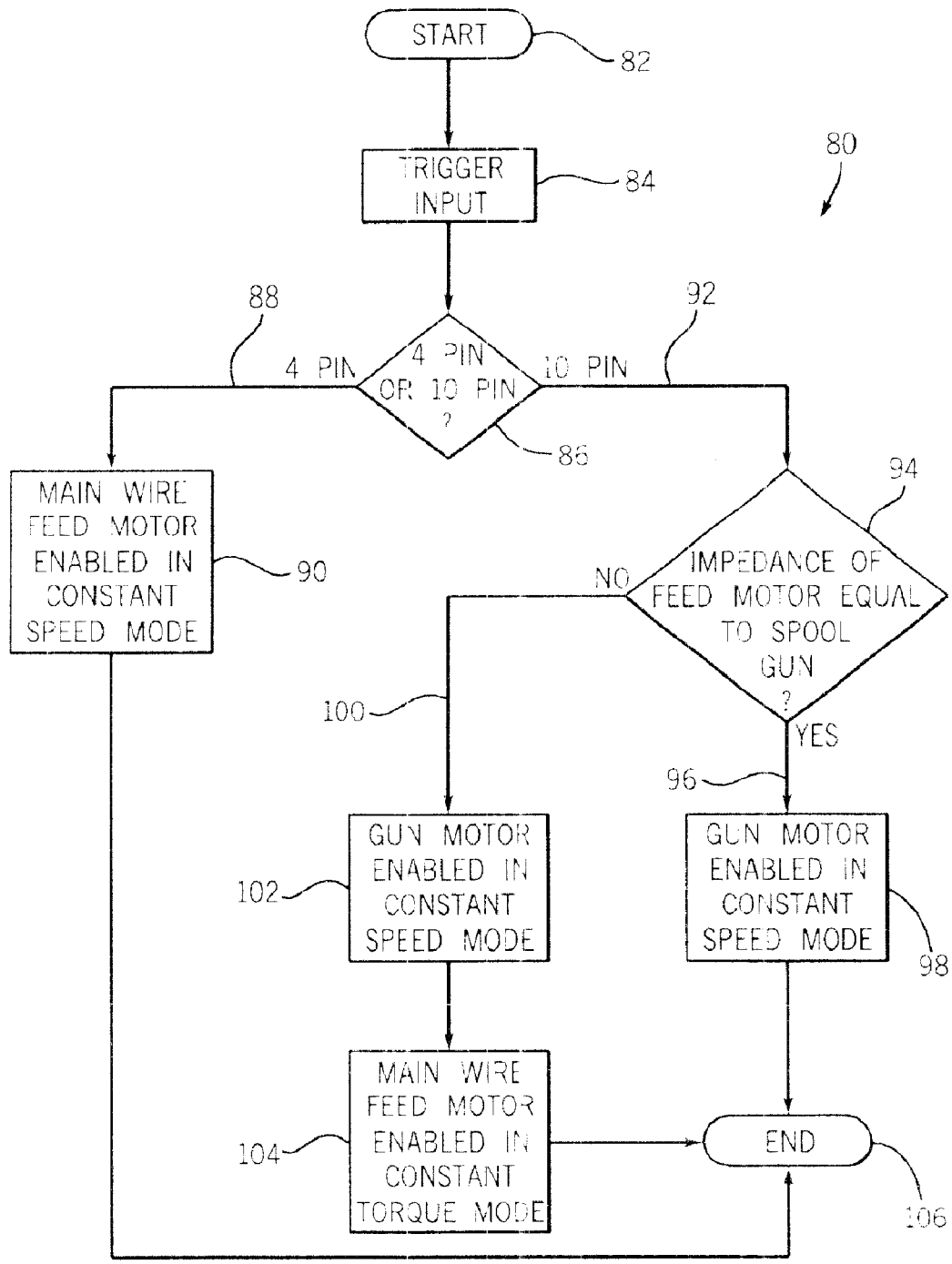
FIG. 5 is a flow chart setting forth the steps of a gun detection algorithm in accordance with the present invention.

Referring now to FIG. 5, the steps of a control algorithm for automatically determining the type of welding gun connected to a wire feeder and setting operating parameters of the wire feeder based on the determined gun type is illustrated. For purposes of illustration and not limitation, the control algorithm will be described with respect to delineation between a standard MIG gun such as that described with respect to FIG. 3, a spool-type gun such as that described with respect to FIG. 4, and a push-pull-type gun such as that described with respect to FIG. 2. However, the present invention is equivalently applicable with the detection of other types of welding guns or other welding components.

Process 80 begins at 82 with the connection of a welding gun or other component to be automatically detected to the wire feeder of a welding system. When the user depresses the trigger on the handle of the welding gun or otherwise provides a signal indicative of commencement of the welding process, e.g. connection of a serial link between the welding gun and the wire feeder, an input is received at 84. From the input 84, algorithm 80 determines at 86 whether the input was received across a 4-pin or a 10-pin connector. If the input was received across a 4-pin connector 86, 88, a controller in the wire feeder automatically enables the wire feed motor in the wire feeder in a constant speed mode at 90. On the other hand, if the controller executing algorithm 80 determines that the input was received across a 10-pin connector 86, 92, a determination is made at 94 whether an impedance of a motor in the welding gun is equal to that of a spool-type gun.

In one exemplary embodiment, the controller compares the measured impedance to a look-up table of values to determine if the input was received from a spool gun. In a further embodiment, the look-up table may also include values delineating between the type of spool guns that may be connectable to the wire feeder. If, based on a comparison between the measured impedance and values contained in one or more look-up tables, the impedance of the feed motor in the welding gun corresponds to that of a spool gun 94, 96 then the motor in the gun is enabled in a constant speed mode at 98. Alternately, characteristics of an electrical circuit or digital signature in the gun may be matched with values in a look-up table to determine the type of gun connected. In this regard, it is determined that a spool gun has been connected to the wire feeder and, accordingly, operating parameters of the spool gun are automatically set based on the determination made at 94. In contrast, if the impedance of the feed motor does not equal that of a spool-type gun 94, 100, a conclusion is then made that a push-pull type of welding gun, such as that described with respect to FIG. 2, is connected to the wire feeder. Accordingly, the motor within the push-pull welding gun is enabled in a constant speed mode at 102. Further, the wire feed motor in the wire feeder is enabled in a constant torque mode. In this regard, the motor assembly within the push-pull welding gun will pull wire from the wire feeder or other wire source at a constant speed whereas the wire feed motor in the wire feeder is enabled to maintain a constant torque on the wire being pushed to the welding gun. Once a determination is made whether the welding gun is a standard MIG gun, a spool-type gun, or a push-pull-type gun, algorithm 80 concludes at 106.

One skilled in the art will readily appreciate that the present invention may also be implemented to delineate between types of standard MIG guns, spool-type guns, and push-pull-type guns. That is, while FIG. 5 has been described with respect to delineating between a push-pull gun, a standard MIG gun, and a spool-type gun, process 80 may also be implemented to differentiate between various types of push-pull guns, spool-type guns, or conventional MIG welding guns. For example, once process 80 concludes that a push-pull-type gun is connected to the wire feeder, a further determination may be made to determine whether a certain type of push-pull-type gun is connected. In this further embodiment, the impedance or some other characteristic of the motor in the push-pull gun may be examined and compared to a set of values in a look-up table to determine the type of push-pull welding gun. Based on the type of push-pull welding gun determined, the operating parameters of the motor in the gun as well as the motor in the wire feeder may be set to a value more tailored to the type of push-pull gun connected to the wire feeder. Further, the look-up table is preferably stored in volatile memory that may be updated as new gun types and models are developed.

As one skilled in the art will fully appreciate, the heretofore description of welding devices not only includes welders, but also includes any system that requires high power outputs, such as heating and cutting systems. Therefore, the present invention is equivalently applicable with any device requiring high power output, including welders, plasma cutters, induction heaters, and the like. Reference to welding power, welding-type power, or welders generally, includes welding, cutting, or heating power. Description of a welding apparatus illustrates just one embodiment in which the present invention may be implemented. The present invention is equivalently applicable with many high power systems, such as cutting and induction heating systems, or any similar systems.

Therefore, in accordance with one embodiment of the present invention, a wire feeder is disclosed and includes an output connectable to a gun assembly. The wire feeder further includes a controller configured to automatically determine gun assembly type when the gun assembly is connected to the output.

In accordance with another embodiment of the present invention, a controller for a welding-type system is configured to detect an impedance of a motor assembly designed to deliver welding wire to a weld. The controller is further configured to determine, from the impedance, a type of load placed on the motor assembly and, based on the type of load, automatically set an output mode of the motor assembly.

According to yet another embodiment of the present invention, a method of controlling operation of a wire feeder includes the step of determining a configuration of pins in a connector connecting a welding gun assembly to a wire feeder. From the configuration of pins, an output mode of a motor assembly in the wire feeder is automatically set.

In accordance with yet a further embodiment of the present invention, a wire feeder includes means for determining a type of welding gun connected to deliver welding wire to a weld and means for automatically setting an output mode of a motor drive assembly based on the type of welding gun.

The present invention has been described in terms of the preferred embodiment, and it is recognized that equivalents, alternatives, and modifications, aside from those expressly stated, are possible and within the scope of the appending claims.

What is claimed is:

1. A wire feeder comprising:
an output connectable to a gun assembly;

a controller configured to automatically determine a type of gun assembly connected to the output;

a motor assembly configured to deliver a consumable electrode to a weld when the gun assembly is activated; and wherein the controller is further configured to determine gun assembly type based on an impedance of a motor assembly in the gun when the gun assembly is first activated.

2. The wire feeder of claim 1, wherein the controller is further configured to determine gun assembly type when a trigger of the gun assembly is depressed.

3. The wire feeder of claim 1, wherein the controller is further configured to determine gun assembly type when a serial communication link is established with a power source or wire feeder.

4. The wire feeder of claim 1, wherein the controller is further configured to compare the impedance to a look-up table of impedance value; to determine gun assembly type.

5. The wire feeder of claim 1, wherein the motor assembly is further configured to deliver a consumable electrode to the weld at a constant speed if a four-pin connector is connected to the output.

6. The wire feeder of claim 5, wherein the motor assembly is further configured to deliver a consumable electrode to the weld at a constant torque if a ten-pin connector of the gun assembly is connected to the output.

7. The wire feeder of claim 6, wherein the controller is further configured to cause a motor in the gun assembly to deliver a consumable electrode to a weld at a constant speed if a ten-pin connector of the gun assembly is connected to the output.

8. The wire feeder of claim 1, wherein the output is ether configured to receive a connector of a MIG welding gun, a spool gun, or a push-pull welding gun.

9. A controller for a welding-type system, the controller configured to:

detect an impedance of a motor assembly designed to deliver welding wire to a weld;

from the impedance, determine a type of load placed on the motor assembly; and based on the type of load, automatically set an output mode of the motor assembly.

10. The controller of claim 9, wherein the type of load is indicative of a gun assembly operationally connected to the motor assembly.

11. The controller of claim 9, wherein the output mode includes one of constant speed mode and constant torque mode with at least one feedback path to the motor assembly.

12. The controller of claim 11, further configured to set the output mode to the constant speed mode if the type of load is a spool-type gun.

13. The controller of claim 11, further configured to set the output mode to the constant speed mode if the type of load is a push-pull type welding gun.

14. The controller of claim 9, further configured to determine a number of pins in a connector of a welding gun operationally connected to a wire feeder having the motor assembly disposed therein.

15. A method of controlling operation of a wire feeder, the method comprising the steps of:

determining configuration of pins in a controller connecting a welding gun assembly to a wire feeder:

from the configuration, automatically setting an output mode of a motor assembly in the wire feeder; and determining an impedance of a gun motor assembly disposed in the welding gun assembly and setting the output mode of the gun motor assembly based on the impedance.

16. The method of claim 15, wherein the output mode of the gun motor assembly includes a constant speed mode if the impedance matches that of a spool gun.

17. The method of claim 15, further comprising the step of setting the output mode of the motor assembly to a constant torque mode if the configuration of pins corresponds to a push-pull welding gun assembly.

18. The method of claim 17, further comprising the step of setting the output mode of the gun motor assembly to a constant speed mode if the configuration of pins corresponds to a push-pull welding gun assembly.

19. An apparatus comprising:

a wire feeder defined by a plurality of side panels, a cover panel, and a base;

a motor disposed in the wire feeder and configured to drive a spooled wire to a weld;

an output terminal connected to a surface of the wire feeder and configured to electrically connect the wire feeder to a welding-type component; and a controller configured to automatically determine a type of gun assembly connected to the output terminal.

20. The apparatus of claim 19, wherein the controller it further configured to determine gun assembly type based on an impedance of a motor assembly in the gun when the gun assembly is first activated.

21. The apparatus of claim 20, wherein the controller is further configured to compare the impedance to a look-up table of impedance values to determine gun assembly type.

22. The apparatus of claim 20, wherein the motor assembly is further configured to deliver a consumable electrode to the weld at a constant speed if a four-pin connector is connected to the output terminal.

23. The apparatus of claim 20, wherein the motor assembly is further configured to deliver consumable electrode to the weld at a constant torque if a ten-pin connector of the gun assembly is connected to the output terminal.

24. The apparatus of claim 19 wherein the output terminal is further configured to receive a connector of a MIG welding gun, a spool gun, or a push-pull welding gun.

25. The apparatus of claim 19 wherein the controller is further configured to determine gun assembly type when a serial communication link is established with a power source.

26. The apparatus of claim 19, wherein the controller is further configured to determine gun assembly type when a trigger of the gun assembly is depressed.

* * * * *

UNITED STATES PATENT AND TRADEMARK OFFICE
CERTIFICATE OF CORRECTION

PATENT NO. : 6,855,914 B1
DATED : February 15, 2005
INVENTOR(S) : Kaufman et al.

It is certified that error appears in the above-identified patent and that said Letters Patent is hereby corrected as shown below:

Column 7,
Line 33, delete "ether" and substitute therefor -- further --;

Column 8,
Line 3, delete "controller" and substitute therefore -- connector --;
Line 46, insert the word -- a -- after "deliver".

Signed and Sealed this

Twenty-second Day of November, 2005

JON W. DUDAS
*Director of the United States Patent and Trademark Office*